Patented Dec. 17, 1940

2,225,302

UNITED STATES PATENT OFFICE 2,225,302

PURIFICATION OF CRUDE PHTHALO-CYANINE PIGMENTS

Jonathan L. Hartwell, Waltham, Mass., assignor to Interchemical Corporation, New York, N. Y., a corporation of Ohio No Drawing. Application October 18, 1938, Serial No. 235,621

1 Claim. (Cl. 260—314)

This invention relates to phthalocyanine pigments of the type made by reacting aromatic ortho dinitriles with metalliferous reactants, and has special reference to a new method of purifying crude pigments of this type, whereby improved color and strength is obtained.

Pigments of this type are made in a manner well known to the art, in a variety of ways, principally by reacting the dinitrile, or some compound capable of yielding the dinitrile with a metalliferous reactant, conducting the reacting either by fusing the nitrile in the presence of the reactant, or by heating in the presence of a solvent. The crude reaction mixture always contains pigment, excess metalliferous reactant and organic byproducts. It has been purified in the past by dissolving it in cold concentrated sulfuric acid (90% or stronger) and then drowning out in water.

I have discovered that greatly improved pigment can be produced by dissolving the pigment as heretofore in cold concentrated sulfuric acid, separating the sulfuric acid solution from the insoluble residue, and then diluting this cold material, at an original temperature of 10° C. or lower with similarly cold dilute sulfuric acid to the point where the pigment is precipitated as an insoluble sulfate, following this by pouring the mixture into water to hydrolyze the sulfate, filtering and washing. As compared with pouring a sulfuric acid solution directly into water, I obtain a pigment which is much softer and of improved color strength.

As a specific example of my invention, I prepared a crude blue pigment by melting 50 pounds of phthalonitrile, adding 6.8 pounds of 300 mesh copper powder to the melt and heating to 225°–350° C. at which point an exothermic reaction sets in. Heat was immediately removed, the melt set up to a solid mass, which was pulverized and extracted with monochlorbenzol to remove the organic impurities.

The blue was dissolved in 10 parts of cold concentrated sulfuric acid (90%) by dusting it into the acid, and the batch separated into halves. One half was run directly into 9 times its weight of cold water; the precipitated pigment was filtered and washed free of acid. While it was of a good blue color, it was rather difficult to grind.

The other half was filtered through asbestos, and the filtrate, cooled to 5° C. was diluted with an equal amount of cold (5° C.) 50% sulfuric acid, until copper phthalocyanine sulfate just precipitated as a green very fine precipitate. This mixture was run into 4 times its weight of cold water, filtered and washed free of acid. The blue pigment recovered had a cleaner mass tone, and was much softer and easier to grind than the product obtained by conventional methods.

The dilute acid used to precipitate the sulfate should not be more dilute than about 20%, nor more concentrated than about 60%, since the final dilution at which the sulfate precipitates is about 75%.

I have used this process on crude copper phthalocyanine blues made by other methods, such as the solvent method described in the Turek Patent 2,138,413, issued November 29, 1938; and have applied it to substituted phthalocyanines such as the chloro-compounds. It may also be used where other metalliferous reactants are used in place of copper, such as cobalt, and compounds of these metals.

What I claim is:

The method of producing a pigment from a reaction mixture of copper phthalocyanine and a cupriferous reactant, which comprises dissolving the copper phthalocyanine in concentrated sulfuric acid, separating undissolved cupriferous reactant, adjusting the temperature to 10° C. diluting the mixture with dilute sulfuric acid adjusted to a temperature of 10° C. or less until a green precipitate is formed, and converting the green precipitate into copper phthalocyanine pigment by drowning out the slurry of green precipitate and diluted sulfuric acid in water.

JONATHAN L. HARTWELL.